(12) United States Patent
Adhate et al.

(10) Patent No.: US 10,920,599 B2
(45) Date of Patent: Feb. 16, 2021

(54) CONTOURED ENDWALL FOR A GAS TURBINE ENGINE

(71) Applicant: United Technologies Corporation, Farmington, CT (US)

(72) Inventors: Abhir A. Adhate, Wallingford, CT (US); Frank M. Prior, Middletown, CT (US); Kalman V. Wagner, West Hartford, CT (US)

(73) Assignee: Raytheon Technologies Corporation, Waltham, MA (US)

( * ) Notice: Subject to any disclaimer, the term of this patent is extended or adjusted under 35 U.S.C. 154(b) by 70 days.

(21) Appl. No.: 16/263,063

(22) Filed: Jan. 31, 2019

(65) Prior Publication Data

US 2020/0248572 A1 Aug. 6, 2020

(51) Int. Cl.
*F01D 9/04* (2006.01)

(52) U.S. Cl.
CPC .......... *F01D 9/041* (2013.01); *F05D 2240/12* (2013.01); *F05D 2250/184* (2013.01); *F05D 2250/51* (2013.01); *F05D 2250/71* (2013.01); *F05D 2250/72* (2013.01)

(58) Field of Classification Search
CPC . F01D 5/143; F01D 9/02; F01D 9/041; F05D 2240/12; F05D 2250/184; F05D 2250/51; F05D 2250/71; F05D 2250/72
See application file for complete search history.

(56) References Cited

U.S. PATENT DOCUMENTS

| 5,397,215 | A | | 3/1995 | Spear et al. |
| 5,466,123 | A | * | 11/1995 | Rose ........................ F01D 5/143 415/182.1 |
| 5,653,580 | A | * | 8/1997 | Faulder ................... F01D 9/042 415/137 |
| 6,017,186 | A | | 1/2000 | Hoeger et al. |
| 7,011,495 | B2 | | 3/2006 | Guemmer |

(Continued)

FOREIGN PATENT DOCUMENTS

| EP | 2458148 | 5/2012 |
| EP | 3032032 | 6/2016 |

(Continued)

OTHER PUBLICATIONS

European Search Report for European Patent Application No. 20155024.1 completed May 4, 2020.

*Primary Examiner* — Igor Kershteyn
(74) *Attorney, Agent, or Firm* — Carlson, Gaskey & Olds, P.C.

(57) ABSTRACT

A vane for a gas turbine engine according to an example of the present disclosure includes, among other things, first and second endwalls each having a radially facing surface that bounds a gas path, an airfoil section extending in a radial direction between the first and second endwalls, extending in an axial direction between an airfoil leading edge and an airfoil trailing edge, and extending in a circumferential direction between pressure and suction sides. The radially facing surface of each of the first and second endwalls is axially sloped such that the gas path converges in the axial direction between the airfoil leading and trailing edges. The first endwall has an axisymmetric contour at least partially swept in the circumferential direction from each of the pressure and suction sides.

20 Claims, 6 Drawing Sheets

(56) References Cited

U.S. PATENT DOCUMENTS

| | | |
|---|---|---|
| 9,879,540 B2 * | 1/2018 | Li .......................... F01D 5/143 |
| 10,125,623 B2 | 11/2018 | Bielek et al. |
| 2012/0051895 A1 * | 3/2012 | Guimbard ............... F01D 5/141 |
| | | 415/191 |
| 2012/0051930 A1 * | 3/2012 | Pandey ................... F01D 5/145 |
| | | 416/223 A |
| 2012/0315136 A1 | 12/2012 | Sonoda et al. |
| 2016/0290645 A1 | 10/2016 | Carr |

FOREIGN PATENT DOCUMENTS

| | | |
|---|---|---|
| WO | 2016032506 | 3/2016 |
| WO | 2018219611 | 12/2018 |

\* cited by examiner

CONTOURED ENDWALL FOR A GAS TURBINE ENGINE

STATEMENT REGARDING FEDERALLY SPONSORED RESEARCH OR DEVELOPMENT

This invention was made with Government support awarded by the United States. The Government has certain rights in this invention.

BACKGROUND

This disclosure relates to gas paths of a gas turbine engine, including endwalls that bound the gas paths.

Gas turbine engines can include a fan section having a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion.

The fan or compressor sections may include one or more rows of vanes that are dimensioned to change an orientation of airflow in a gas path from an upstream blade row to prepare the airflow for delivery to a downstream blade row.

SUMMARY

A vane for a gas turbine engine according to an example of the present disclosure includes first and second endwalls each having a radially facing surface that bounds a gas path, an airfoil section extending in a radial direction between the first and second endwalls, extending in an axial direction between an airfoil leading edge and an airfoil trailing edge, and extending in a circumferential direction between pressure and suction sides. The radially facing surface of each of the first and second endwalls is axially sloped such that the gas path converges in the axial direction between the airfoil leading and trailing edges. The first endwall has an axisymmetric contour at least partially swept in the circumferential direction from each of the pressure and suction sides.

In a further embodiment of any of the foregoing embodiments, the first endwall extends in the circumferential direction between opposed mate faces, and the axisymmetric contour is swept in the circumferential direction between the pressure and suction sides and respective ones of the opposed mate faces.

In a further embodiment of any of the foregoing embodiments, the axisymmetric contour is a depression in the radially facing surface.

In a further embodiment of any of the foregoing embodiments, the axisymmetric contour has an arcuate cross sectional geometry.

In a further embodiment of any of the foregoing embodiments, the arcuate cross sectional geometry includes an apex that is skewed in the axial direction toward one of the airfoil leading and trailing edges.

In a further embodiment of any of the foregoing embodiments, the axisymmetric contour is a protrusion that extends outwardly from the radially facing surface and into the gas path.

In a further embodiment of any of the foregoing embodiments, the axisymmetric contour has an arcuate cross sectional geometry.

In a further embodiment of any of the foregoing embodiments, the axisymmetric contour has a sinusoidal cross sectional geometry.

In a further embodiment of any of the foregoing embodiments, the sinusoidal cross sectional geometry includes a concave portion and a convex portion, the concave portion extends inwardly from the radially facing surface with respect to the radial direction, the convex portion extends outwardly from the radially facing surface with respect to the radially direction, and the concave portion is defined between the airfoil leading edge and the convex portion with respect to the axial direction.

In a further embodiment of any of the foregoing embodiments, the vane is a fan stator.

A section for a gas turbine engine according to an example of the present disclosure includes a rotor carrying an array of blades that extend into a gas path. The rotor is rotatable about a longitudinal axis. An array of vanes are distributed about the longitudinal axis. Each of the vanes includes an airfoil section extending in a radial direction between inner and outer endwalls, extending in an axial direction between an airfoil leading edge and an airfoil trailing edge, and extending in a circumferential direction between pressure and suction sides. The inner and outer endwalls each have a radially facing surface dimensioned such that the gas path converges in the axial direction at the airfoil trailing edge relative to the airfoil leading edge. The outer endwall includes an axisymmetric contour at least partially swept in the circumferential direction from the pressure and suction sides.

In a further embodiment of any of the foregoing embodiments, the radially facing surface extends in the circumferential direction between opposed mate faces, and the axisymmetric contour is swept in the circumferential direction between the mate faces of the outer endwall and the respective pressure and suction sides.

In a further embodiment of any of the foregoing embodiments, the array of vanes are axially forward of the array of blades relative to the longitudinal axis such that the array of vanes and the array of blades comprise adjacent stages of the section.

In a further embodiment of any of the foregoing embodiments, the axisymmetric contour has an arcuate cross sectional geometry.

In a further embodiment of any of the foregoing embodiments, the axisymmetric contour has a sinusoidal cross sectional geometry.

A gas turbine engine according to an example of the present disclosure includes a fan section, a combustor in fluid communication with the fan section, and a turbine section rotationally coupled to the fan section. The fan section includes a row of blades rotatable about an engine longitudinal axis, a stator assembly that has a row of vanes adjacent the row of blades, and each of the vanes including an airfoil section extending in a radial direction between inner and outer endwalls that bound a gas path, extending in an axial direction between an airfoil leading edge and an airfoil trailing edge, and extending in the circumferential direction between pressure and suction sides. The inner and outer endwalls converge in the axial direction to define a converging portion of the gas path. The stator assembly includes an axisymmetric contour swept in the circumferential direction along the outer endwall between each of the vanes to bound the converging portion of the gas path.

In a further embodiment of any of the foregoing embodiments, the row of blades and the row of vanes comprise an axially forwardmost stage of the gas turbine engine relative to the engine longitudinal axis.

In a further embodiment of any of the foregoing embodiments, the axisymmetric contour is swept in the circumferential direction between the pressure and suction sides of adjacent ones of the vanes.

In a further embodiment of any of the foregoing embodiments, radially facing surfaces of the inner and outer endwalls are axially sloped in the axial direction between the airfoil leading and trailing edges to define the converging portion of the gas path.

In a further embodiment of any of the foregoing embodiments, the axisymmetric contour has an arcuate cross sectional geometry including an apex that is skewed in the axial direction toward one of the airfoil leading and trailing edges.

The various features and advantages of this disclosure will become apparent to those skilled in the art from the following detailed description. The drawings that accompany the detailed description can be briefly described as follows.

DETAILED DESCRIPTION

Figure 1:
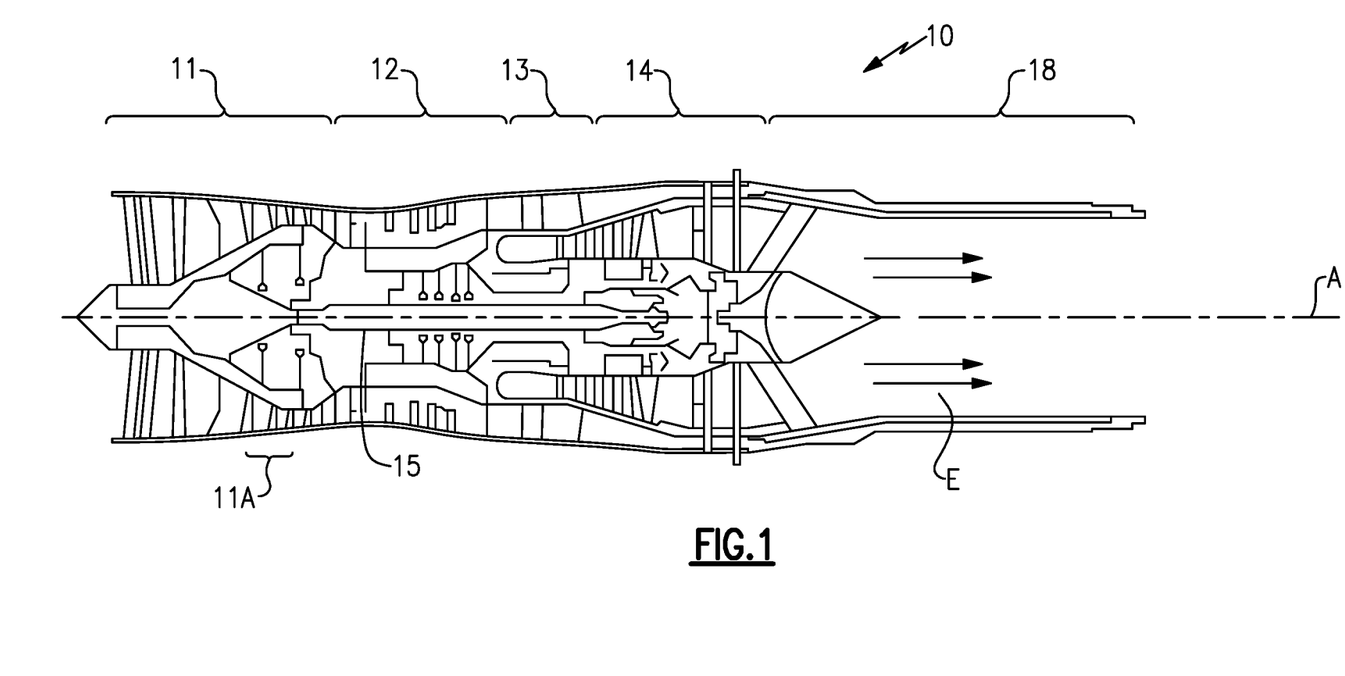
FIG. 1 illustrates an example turbine engine.

Referring to FIG. 1, a gas turbine engine 10 includes a fan section 11, a compressor section 12, a combustor section 13, and a turbine section 14, The turbine section 14 is rotationally coupled to the fan section 11 and compressor section 12 with at least one shaft 15. Air entering into the fan section 11 is initially compressed and fed to the compressor section 12, In the compressor section 12, the incoming air from the fan section 11 is further compressed and communicated to the combustor section 13. In the combustor section 13, the compressed air is mixed with gas and ignited to generate a hot exhaust stream E. The hot exhaust stream E is expanded through the turbine section 14 to drive the fan section 11 and the compressor section 12. The exhaust gasses E flow from the turbine section 14 through an exhaust liner assembly 18.

Figure 2:
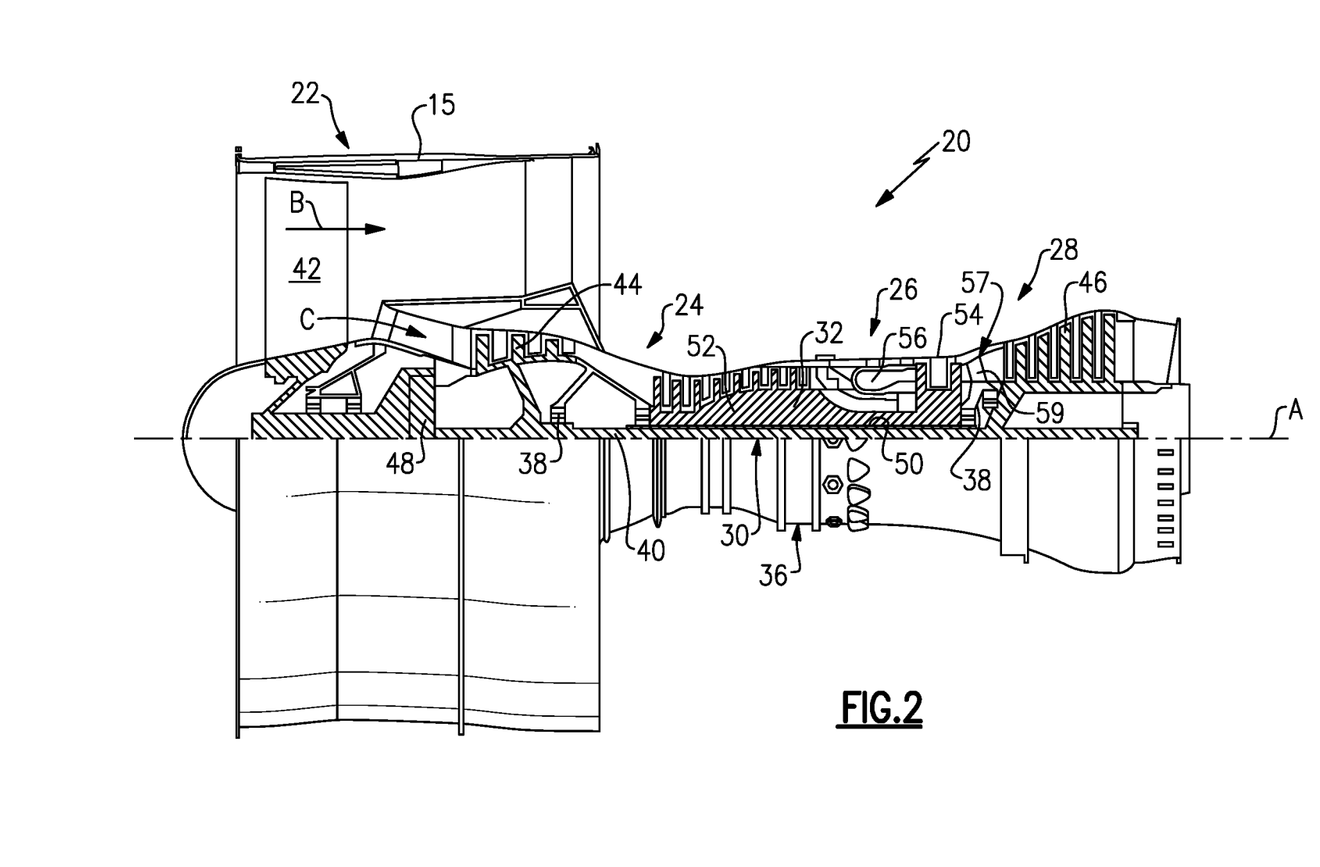
FIG. 2 illustrates a turbine engine according to another example.

FIG. 2 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram °R)/(518.7°R)]^{0.5}$. The "Low corrected fan tip speed" as disclosed herein according to one non-limiting embodiment is less than about 1150 ft/second (350.5 meters/second).

Figure 3:
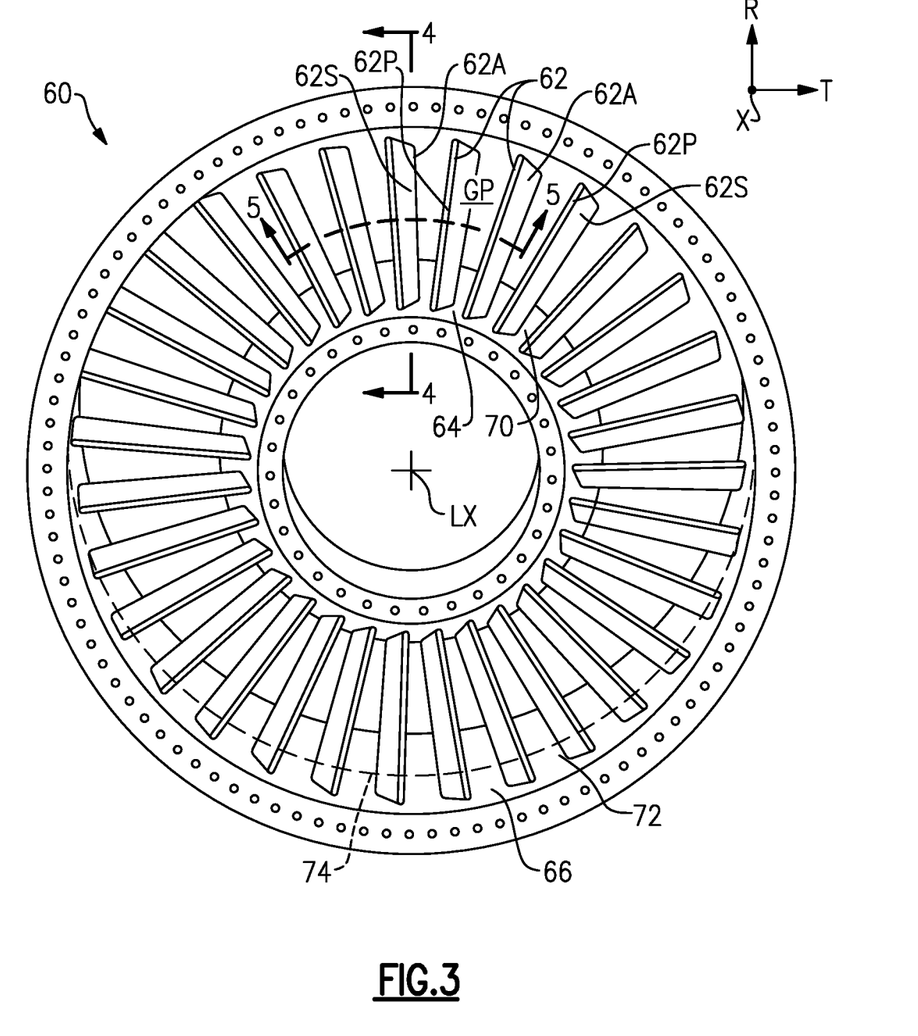
FIG. 3 illustrates an exemplary stator assembly.

FIG. 3 illustrates a stator assembly 60 for a gas turbine engine according to an example. The stator assembly 60 can be incorporated into a portion of the engines 10, 20, such as the fan sections 11, 22 and compressor sections 12, 24. However, it should to be understood that other portions of the engines 10, 20, including blade and vane arrangements, and other systems such as land-based turbines may benefit from the teachings disclosed herein.

The stator assembly 60 includes an array of stators or vanes 62 that are distributed about a longitudinal axis LX, The longitudinal axis LX can be collinear with or parallel to the engine longitudinal axis A of FIGS. 1 and 2. The stator assembly 60 includes an inner (or first) endwall 64 and an outer (or second) endwall 66 circumferentially extending about the longitudinal axis LX to bound inner and outer diameters of a gas path GP, Each of the vanes 62 includes an airfoil section 62A extending in a spanwise or radial direction R between the inner and outer endwalls 64, 66. Each of the endwalls 64, 66 can have a generally elliptical or hoop-shaped geometry.

Figure 4:
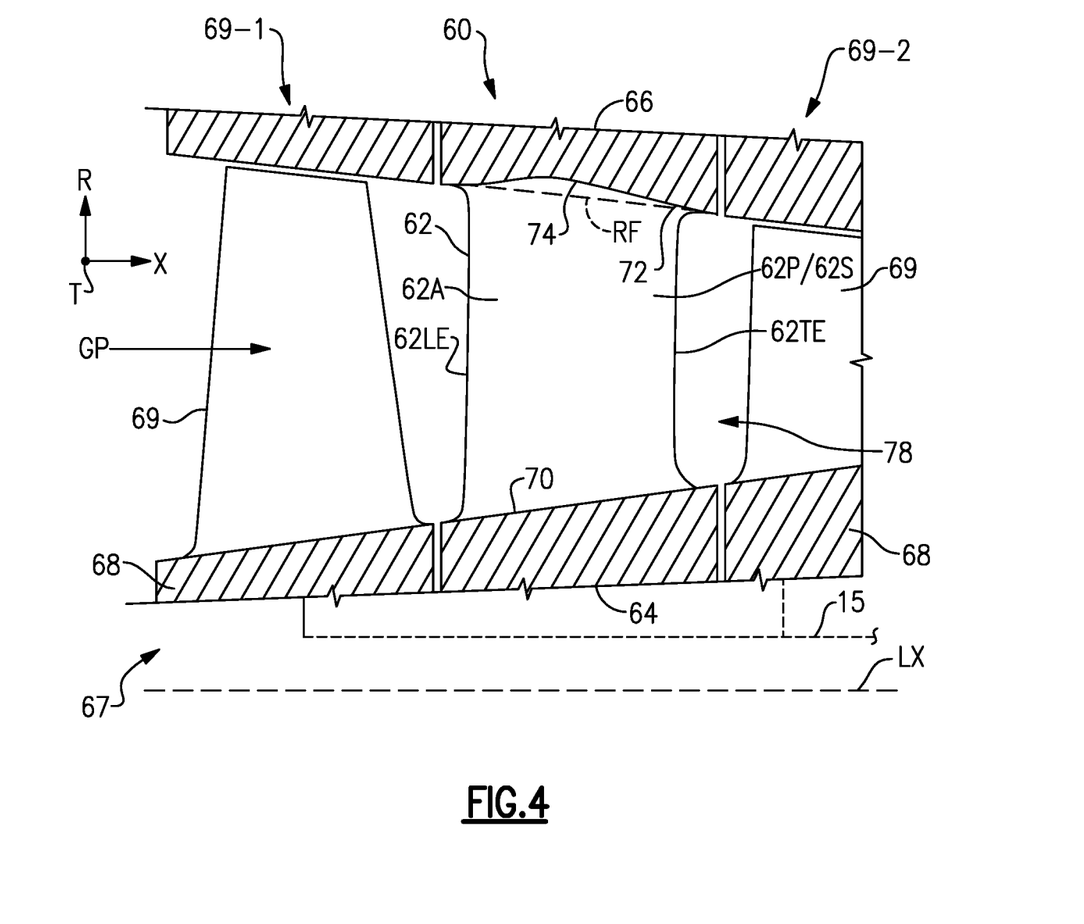
FIG. 4 illustrates the stator assembly taken along line 4-4 of FIG. 3.
Figure 5:
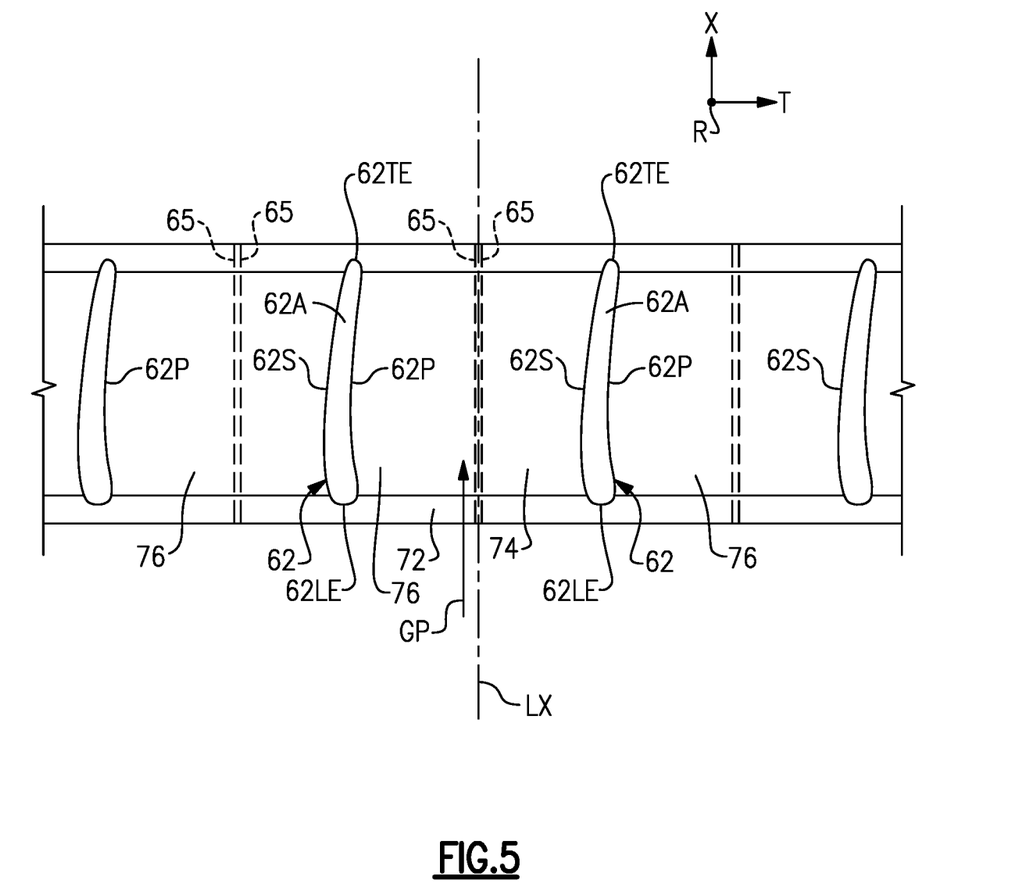
FIG. 5 illustrates the stator assembly taken along line 5-5 of FIG. 3.

Referring to FIG. 4, with continuing reference to FIG. 3, the stator assembly 60 is shown adjacent to a rotor assembly 67. Each airfoil section 62A extends in an axial direction X between an airfoil leading edge 62LE and an airfoil trailing edge 62TE. Each airfoil section 62A extends in a circumferential or thickness direction T between pressure and suction sides 62P, 62S (FIGS. 3 and 5).

The rotor assembly 67 includes rotors 68 each carrying an array of blades 69 that extend into the gas path GP. In the illustrative example of FIG. 4, the blades 69 are arranged into at least an upstream (or first) blade row 69-1 and a downstream (or second) blade row 69-2 relative to a general direction of flow in the gas path GP. The rotors 68 and blades 69 are rotatable about the longitudinal axis LX. The stator assembly 60 is positioned between, or is otherwise adjacent to, the first and second blade rows 69-1, 69-2 such that the upstream blade row 69-1 communicates flow in the gas path GP to the vanes 62 and such that the vanes 62 communicate the flow to the downstream blade row 69-2.

The vanes 62 can serve as fan stators. For example, the upstream blade row 69-1 and the row of vanes 62 of the stator assembly 60 can be incorporated into the fan sections 11, 22 and can comprise an axially forwardmost stage of the engines 10, 20 relative to the engine longitudinal axis A (see, e.g., stage 11A of FIG. 1). In other examples, the stator assembly 60 is incorporated into downstream fan or compressor stage(s) of the engines 10, 20. The vanes 62 are axially forward of the downstream blade row 69-2 such that the vanes 62 and blade row 69-2 can comprise adjacent stages of a section of the engine 10, 20.

The inner endwall 64 includes a radially facing surface 70. The outer endwall 66 includes a radially facing surface 72 that is radially opposed to the radially facing surface 70 of the inner endwall 64 to radially bound the gas path GP (see also FIG. 3). The radially facing surfaces 70, 72 have a major component that extends generally parallel to the longitudinal axis LX.

In the illustrative example of FIG. 4, the radially facing surfaces 70, 72 are axially sloped, converge or are otherwise dimensioned to converge in the axial direction X relative to the longitudinal axis LX to define a converging portion 78 of the gas path GP, including at the airfoil trailing edge 62LE relative to the airfoil leading edge 62TE. The converging portion 78 is dimensioned such that a cross-sectional area of the gas path GP at the airfoil leading edges 62LE is greater than a cross-sectional area of the gas path GP at the airfoil trailing edges 62TE. In examples, the cross-sectional area of the gas path GP at the airfoil trailing edges 62TE is less than 95% of the cross-sectional area of the gas path GP at the airfoil leading edges 62LE. Both of the radially facing surfaces 70, 72 can be axially sloped in the axial direction X between the airfoil leading and trailing edges 62LE, 62TE to define the converging portion 78.

The airfoil section 62A of each vane 62 can be integrally formed with the inner and/or outer endwalls 64, 66. In other examples, the airfoil section 62A and inner and/or outer endwalls 64, 66 are separate and distinct components that are mounted to or otherwise fixedly secured to each other. In some examples, the endwalls 64, 66 are segmented such that the endwalls 64, 66 extend in the circumferential direction T between opposed mate faces 65 (shown in dashed lines in FIG. 5 for illustrative purposes).

At least one of the radially facing surfaces 70, 72 can be contoured to direct or orient flow in a predefined direction along the gas path GP. In the illustrative example of FIG. 4, the radially facing surface 72 of the outer endwall 66 includes an axisymmetric contour 74 that bounds or otherwise defines the gas path GP. The contour 74 can be defined along the converging portion 78 of the gas path GP. For the purposes of this disclosure, the term "axisymmetric contour" means a contour that is axisymmetric relative to a respective axis (e.g., engine centerline axis) and excludes minor interruptions and manufacturing imperfections in the surface and filleting at a base of the respective airfoil. An axial position of the contour 74 can be defined relative to expected aerodynamic loading on the airfoil sections 62A.

Referring to FIG. 5, with continuing reference to FIG. 4, the axisymmetric contour 74 is at least partially swept in the circumferential direction T about the longitudinal axis LX (also shown in dashed lines in FIG. 3 for illustrative purposes). The contour 74 is at least partially swept in the circumferential direction T from the pressure and suction sides 62P, 62S of the airfoil sections 62A. In the illustrative example of FIG. 5, the contour 74 includes a plurality of sections 76 that extend between the pressure and suction sides 62P, 62S of adjacent airfoil sections 62A such that the contour 74 is swept in the circumferential direction T along the outer endwall 66 between the pressure and suction sides 62P, 62S of adjacent airfoils 62A and between each of the vanes 62 to bound the converging portion 78 of the gas path GP. In examples including mate faces 65, the contour 74 is swept in the circumferential direction T between the pressure and suction sides 62P, 62S and respective ones of the mate faces 65.

In the illustrative example of FIG. 5, the axisymmetric contour 74 is a depression in the radially facing surface 72 extends inwardly from a reference plane RF (shown in dashed lines in FIG. 4). The reference plane RF extends between junctions of the leading and trailing edges 62LE, 62TE and the outer endwall 66. The contour 74 has an arcuate, concave cross-sectional geometry that is circumferentially swept about the longitudinal axis LX to define an annular trench or groove in the outer endwall 66. The contour 74 can reduce a circumferential velocity of flow in the gas path GP, which can reduce aerodynamic loading on the airfoil sections 62A and increase loading on the endwall 66 adjacent the pressure side 62P of the airfoil section 62A to turn the flow without a net increase in loss and exit angle deviation.

Figure 6:
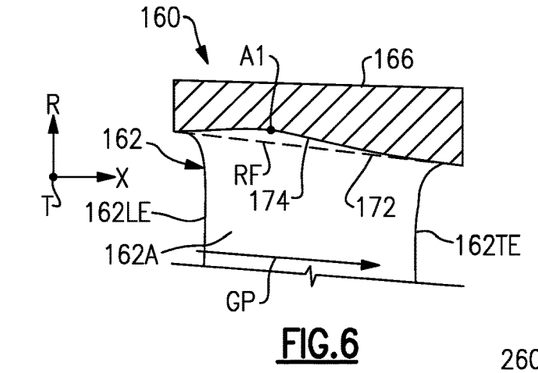
FIG. 6 illustrates a stator assembly including an endwall contour according to an example.

FIG. 6 illustrates a stator assembly 160 including an endwall contour according to an example. In this disclosure, like reference numerals designate like elements where appropriate and reference numerals with the addition of one-hundred or multiples thereof designate modified elements that are understood to incorporate the same features and benefits of the corresponding original elements.

Figure 7:
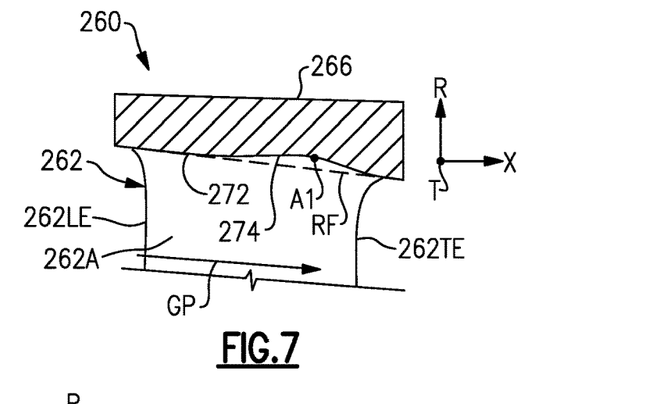
FIG. 7 illustrates a stator assembly including an endwall contour according to another example.

A stator or vane 162 includes an airfoil section 162A extending in a radial direction R from an endwall 166. A radially facing surface 172 of endwall 166 includes an axisymmetric contour 174 having an arcuate cross sectional geometry. The arcuate cross sectional geometry includes an apex A1 that is skewed in an axial direction X toward one of the airfoil leading and trailing edges 162LE, 162TE. In the illustrative example of FIG. 6, the apex A1 is skewed towards the airfoil leading edge 162LE. In the illustrative example of FIG. 7, contour 274 has an arcuate cross sectional geometry and is dimensioned such that apex A1 is skewed in an axial direction X towards an airfoil trailing edge 262TE.

Figure 8:
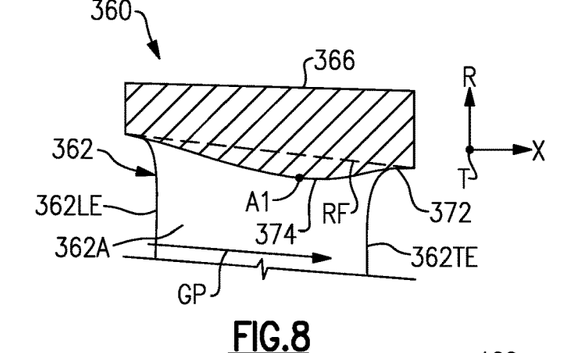
FIG. 8 illustrates a stator assembly including an endwall contour according to yet another example.

FIG. 8 illustrates a stator assembly 360 including an endwall contour according to an example. In the illustrative example of FIG. 8, axisymmetric contour 374 is a protrusion that extends outwardly from radially facing surface 372 and into gas path GP. The axisymmetric contour 374 has an arcuate, convex cross-sectional geometry defining an apex A1 that is radially outward of reference plane RF. The apex A1 can be skewed towards airfoil trailing edge 362TE, as illustrated in FIG. 8, or towards airfoil leading edge 362LE. It should be appreciated that the axisymmetric contours disclosed herein can include complex and other cross sectional geometries.

Figure 9:
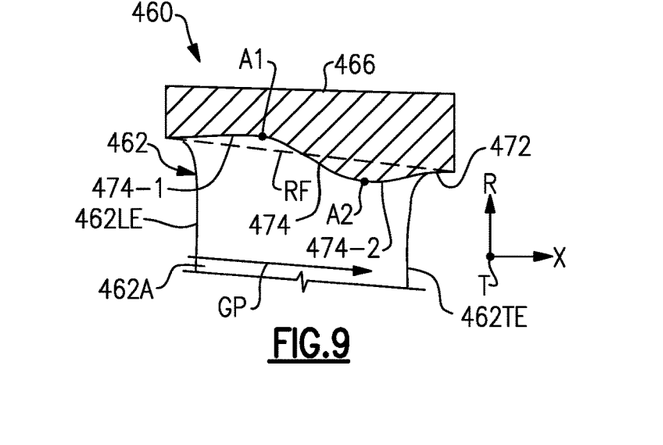
FIG. 9 illustrates a stator assembly including an endwall contour according to another example.

FIG. 9 illustrates a stator assembly 460 including an endwall contour according to an example. A radially facing surface 472 of endwall 466 includes an axisymmetric contour 474 having a sinusoidal cross sectional geometry. The sinusoidal cross sectional geometry includes a concave portion 474-1 and a convex portion 474-2 defining apexes A1, A2, respectively. The concave portion 474-1 extends inwardly from radially facing surface 472 with respect to a radial direction R. The convex portion 474-2 extends outwardly from the radially facing surface 472 with respect to the radially direction R. In the illustrative example of FIG. 9, the concave portion 474-1 is defined between airfoil leading edge 462LE and the convex portion 474-2 with respect to an axial direction X. The convex portion 474-2 can reduce aerodynamic loading on the downstream blade row(s).

The contours 74/174/274/374/474 disclosed herein can be utilized to change a radius of flow from upstream blades that may operate at relatively high Mach numbers. The change in radius can reduce swirl and secondary flow losses in the respective gas path. The contours 74/174/274/374/474 can be utilized to reduce peak Mach numbers and aerodynamic loading on the adjacent airfoil sections and downstream blade rows. Although the contours 74/174/274/374/474 disclosed herein primarily refer to an outer endwall, it should be appreciated that any of the contours 74/174/274/374/474 can be utilized for an inner endwall in view of the teachings disclosed herein.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A vane for a gas turbine engine comprising:
    first and second endwalls each including a radially facing surface that bounds a gas path;
    an airfoil section extending in a radial direction between the first and second endwalls, extending in an axial direction between an airfoil leading edge and an airfoil trailing edge, and extending in a circumferential direction between pressure and suction sides;
    wherein the radially facing surface of each of the first and second endwalls is axially sloped such that the gas path converges in the axial direction between the airfoil leading and trailing edges;
    wherein the first endwall includes an axisymmetric contour at least partially swept in the circumferential direction from each of the pressure and suction sides; and
    wherein the first endwall extends in the circumferential direction between opposed mate faces of the outer endwall, and the axisymmetric contour is swept in the circumferential direction from the pressure and suction sides to respective ones of the opposed mate faces.

2. The vane as recited in claim 1, wherein the axisymmetric contour is a depression in the radially facing surface.

3. The vane as recited in claim 2, wherein the axisymmetric contour has an arcuate cross sectional geometry.

4. The vane as recited in claim 3, wherein the arcuate cross sectional geometry includes an apex that is skewed in the axial direction toward one of the airfoil leading and trailing edges.

5. The vane as recited in claim 1, wherein the axisymmetric contour is a protrusion that extends outwardly from the radially facing surface and into the gas path.

6. The vane as recited in claim 5, wherein the axisymmetric contour has an arcuate cross sectional geometry.

7. The vane as recited in claim 1, wherein the axisymmetric contour has a sinusoidal cross sectional geometry.

8. The vane as recited in claim 7, wherein the sinusoidal cross sectional geometry includes a concave portion and a convex portion, the concave portion extends inwardly from the radially facing surface with respect to the radial direction, the convex portion extends outwardly from the radially facing surface with respect to the radially direction, and the concave portion is defined between the airfoil leading edge and the convex portion with respect to the axial direction.

9. The vane as recited in claim 1, wherein the vane is a fan stator.

10. A section for a gas turbine engine comprising:
a rotor carrying an array of blades that extend into a gas path, the rotor rotatable about a longitudinal axis; and
an array of vanes distributed about the longitudinal axis, wherein each of the vanes comprises:
an airfoil section extending in a radial direction between inner and outer endwalls, extending in an axial direction between an airfoil leading edge and an airfoil trailing edge, and extending in a circumferential direction between pressure and suction sides;
wherein the inner and outer endwalls each includes a radially facing surface dimensioned such that the gas path converges in the axial direction at the airfoil trailing edge relative to the airfoil leading edge;
wherein the outer endwall includes an axisymmetric contour at least partially swept in the circumferential direction from the pressure and suction sides; and
wherein the radially facing surface extends in the circumferential direction between opposed mate faces of the outer endwall, and the axisymmetric contour is swept in the circumferential direction from the pressure and suction sides to respective ones of the opposed mate faces.

11. The section as recited in claim 10, wherein the array of vanes are axially forward of the array of blades relative to the longitudinal axis such that the array of vanes and the array of blades comprise adjacent stages of the section.

12. The section as recited in claim 11, wherein the axisymmetric contour has an arcuate cross sectional geometry.

13. The section as recited in claim 11, wherein the axisymmetric contour has a sinusoidal cross sectional geometry.

14. The section as recited in claim 13, wherein the axisymmetric contour includes an arcuate depression in the radially facing surface of the outer endwall and that extends inwardly from a reference plane, the reference plane extends between junctions of the leading and trailing edges and the outer endwall, and the axisymmetric contour includes an arcuate protrusion that establishes the apex, the sinusoidal cross sectional geometry established by the depression and the protrusion, and the protrusion extending outwardly from the radially facing surface and into the gas path such that an apex of the depression and the apex of the protrusion are on opposed sides of the reference plane.

15. A gas turbine engine comprising:
a fan section;
a combustor in fluid communication with the fan section;
a turbine section rotationally coupled to the fan section; and
wherein the fan section includes a row of blades rotatable about an engine longitudinal axis, a stator assembly including a row of vanes adjacent the row of blades, and wherein each of the vanes comprises:
an airfoil section extending in a radial direction between inner and outer endwalls that bound a gas path, extending in an axial direction between an airfoil leading edge and an airfoil trailing edge, and extending in the circumferential direction between pressure and suction sides; and
wherein the inner and outer endwalls converge in the axial direction to define a converging portion of the gas path;
wherein the stator assembly includes an axisymmetric contour swept in the circumferential direction along the outer endwall between each of the vanes to bound the converging portion of the gas path; and
wherein the axisymmetric contour is swept in the circumferential direction from the pressure side of each of the vanes to the suction side of adjacent ones of the vanes.

16. The gas turbine engine as recited in claim 15, wherein the row of blades and the row of vanes comprise an axially forwardmost stage of the gas turbine engine relative to the engine longitudinal axis.

17. The gas turbine engine as recited in claim 15, wherein radially facing surfaces of the inner and outer endwalls are axially sloped in the axial direction between the airfoil leading and trailing edges to define the converging portion of the gas path.

18. The gas turbine engine as recited in claim 17, wherein the axisymmetric contour has an arcuate cross sectional geometry including an apex that is skewed in the axial direction toward one of the airfoil leading and trailing edges.

19. The gas turbine engine as recited in claim 18, wherein the axisymmetric contour includes an arcuate depression in the radially facing surface of the outer endwall and that extends inwardly from a reference plane, the reference plane extends between junctions of the leading and trailing edges and the outer endwall, and the axisymmetric contour includes an arcuate protrusion that establishes the apex, the axisymmetric contour having a sinusoidal cross sectional geometry established by the depression and the protrusion, and the protrusion extending outwardly from the radially facing surface and into the gas path such that an apex of the depression and the apex of the protrusion are on opposed sides of the reference plane.

20. The gas turbine engine as recited in claim 19, wherein the radially facing surface of the outer endwall slopes radially inward in the axial direction from the airfoil leading edge towards the airfoil trailing edge and the radially facing surface of the inner endwall slopes radially outward in the axial direction from the airfoil leading edge towards the airfoil trailing edge to define the converging portion of the gas path.

* * * * *